J. A. F. LINDGREN.
LATHE TOOL HOLDER.
APPLICATION FILED MAR. 6, 1911.
997,568.
Patented July 11, 1911.
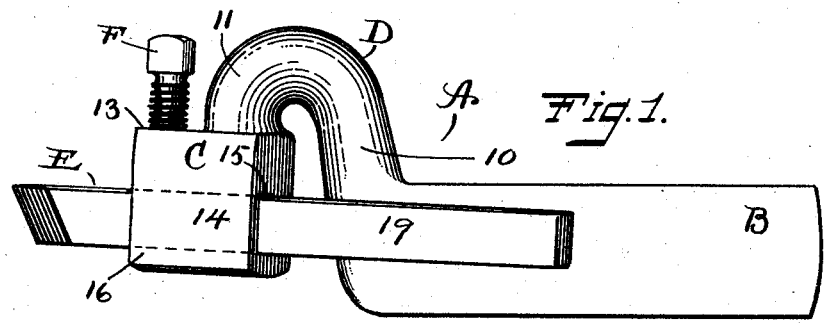
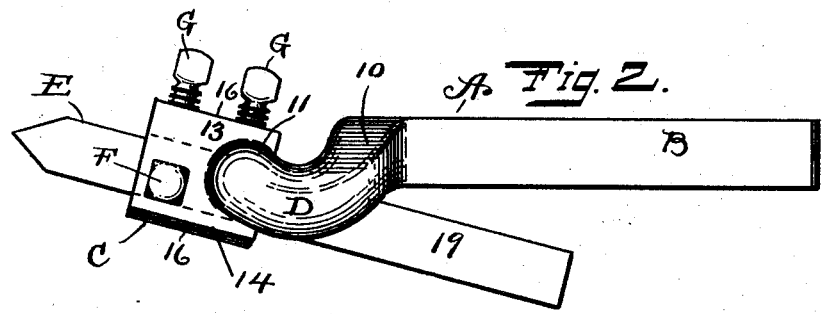
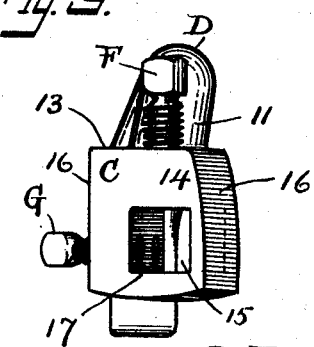
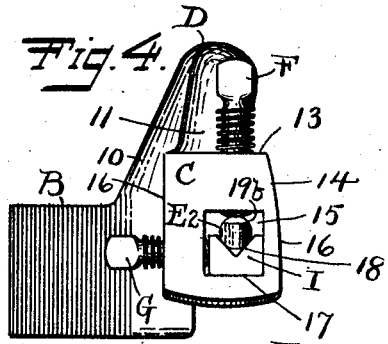
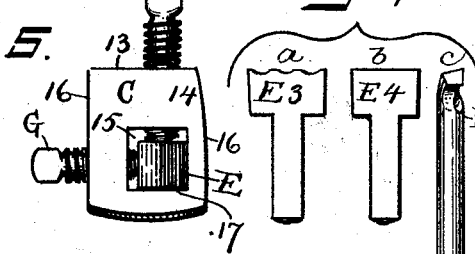
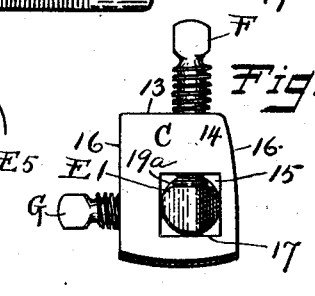
Witnesses:
S. H. Clarke
L. Lockwood
Inventor
Joseph A. F. Lindgren
By Louis N. Schmidt
Atty.

UNITED STATES PATENT OFFICE.

JOSEPH A. F. LINDGREN, OF NEW BRITAIN, CONNECTICUT.

LATHE-TOOL HOLDER.

997,568.  Specification of Letters Patent.  Patented July 11, 1911.

Application filed March 6, 1911. Serial No. 612,676.

*To all whom it may concern:*

Be it known that I, JOSEPH A. F. LINDGREN, a citizen of the United States, residing at New Britain, in the county of Hartford and State of Connecticut, have invented certain new and useful Improvements in Lathe-Tool Holders, of which the following is a specification.

My invention relates to improvements in lathe tool holders, and the objects of my improvements are simplicity and economy in construction and convenience and efficiency in use.

In the accompanying drawing:—Figure 1 is a side elevation of my improved lathe tool holder and a thread cutting tool held therein. Fig. 2 is a plan view of the same. Fig. 3 is a front end view of the same, the tool being omitted. Fig. 4 is a similar view of the same as viewed directly from the front end of the tool holder proper, and a tool of ¼ inch round stock secured in the V of a block resting on the bottom of the tool channel. Fig. 5 is a similar view of the tool holder proper, and a tool having a square shank and smaller than that shown in Figs. 1 and 2. Fig. 6 is a similar view of the same and a tool of $\frac{7}{16}$ inch round stock. Fig. 7 is a plan view of three different kinds of tools, respectively (*a*) forming tool, (*b*) backing off tool, and (*c*) boring tool, having a round shank.

A is my improved lathe tool holder and comprises at one end a shank B of the usual form and suitable for being received in a tool post and at the other end is provided with a tool holder proper C and intermediate the said shank and tool holder proper is provided with a goose-neck D. The said shank is of the usual rectangular cross-section, and at the inner end merges into one of the arms 10 of the said goose-neck, which latter extends upward and returns, following a hook or inverted U formation, the other goose-neck arm 11, remote from the said shank B terminating as shown in the top side 13 of the said tool holder proper C. The said tool holder proper C consists essentially of a cubical block or body 14, supported from its top side 13 by the said goose-neck D as described, and is provided with a longitudinal channel 15 suitable for receiving a shank 19 of a tool E and extending horizontally through the said body 14 and also with tool clamping means to be described. The said tool receiving channel 15 has a square cross-section and is of dimensions such as to give clearance for a tool E having a shank about $\frac{7}{16}$ inch square, such as 19 in Fig. 1. The said clamping means comprises a top clamping screw F, corresponding generally to the form of clamping screws in ordinary use, though I prefer to have the same off-set slightly so as to operate centrally on a square shank 19 such as described when clamped against one side of the tool receiving channel 15 by the lateral clamping screws to be described. The said lateral clamping screws G as shown are a pair of screws extending through one of the side walls 16 of the said body 14, in horizontal alinement, and slightly below the middle line of the said channel 15 suitable for being received centrally on the said shank 19. The clamping means described operate respectively on the side and top of a tool shank and coöperate in a manner to rigidly and positively secure a tool shank to which they are applied, and furthermore, the clamping means described are effective in securing in such a manner a tool $E^1$ having a shank of circular cross-section, such as $19^a$, Fig. 6, as well as square in cross-section.

In order to secure a tool $E^2$ having a small shank $19^b$ and of circular formation, such as ¼ inch rod, I provide a V block I, which is a good fit for the bottom 17 of the said channel 15 and is of depth such as to be clamped laterally by the said lateral clamping screws G, and has the V groove 18 uppermost, wherein the said tool shank $19^b$ is receivable and which is in position to be clamped downward by the said top clamping screw F. I prefer to direct the said tool receiving channel 15 at an angle relatively to the direction of alinement of the said shank B, as shown in Figs. 1 and 2, whereby the length of the tool shank received in the said channel 15 is not limited by the said shank B or any other part of the holder A, and a tool may be held in the said channel that consists of simply a straight piece of tool stock, such as E, in Figs. 1 and 2, having one end formed into a cutting edge and the shank 19 of the same may extend backwardly by the tool holder shank B, and the tool post in which the same may be held.

As described, my tool holder is suitable for holding tools of different styles, such as forming tools $E^3$ or backing off tools $E^4$, boring tools $E^5$, threading tools E, and tools having different sized shanks, and made of different sizes and shapes of tool stock in the form of rod, and with the gooseneck provided as described, any of the tools described may be used safely and to advantage, whereby the speed of operation may be greater than with a solid tool and without danger of damage to the tool, or the work or the machine.

I claim as my invention:

A tool holder comprising a shank, a goose neck extending from the end thereof, and a tool holder proper supported by the free end of the said goose neck and having a longitudinal tool channel, the said goose neck having a twist intermediate said ends whereby pressure on a tool in the said channel will deflect the said tool holder proper to one side of and clear of the said shank.

JOSEPH A. F. LINDGREN.

Witnesses:
SHEFFIELD H. CLARKE,
NEWTON L. LOCKWOOD.